US010489447B2

United States Patent
Chen et al.

(10) Patent No.: US 10,489,447 B2
(45) Date of Patent: Nov. 26, 2019

(54) METHOD AND APPARATUS FOR USING BUSINESS-AWARE LATENT TOPICS FOR IMAGE CAPTIONING IN SOCIAL MEDIA

(71) Applicant: FUJI XEROX CO., LTD., Tokyo (JP)

(72) Inventors: Yin-Ying Chen, Sunnyvale, CA (US); Francine Chen, Menlo Park, CA (US); Matthew L. Cooper, San Francisco, CA (US); Dhiraj Joshi, Fremont, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 754 days.

(21) Appl. No.: 14/973,264

(22) Filed: Dec. 17, 2015

(65) Prior Publication Data

US 2017/0177623 A1    Jun. 22, 2017

(51) Int. Cl.
*G06F 16/00*     (2019.01)
*G06F 16/58*     (2019.01)
(Continued)

(52) U.S. Cl.
CPC ........ *G06F 16/5866* (2019.01); *G06F 16/285* (2019.01); *G06F 16/95* (2019.01); *G06F 16/9537* (2019.01); *G06F 17/275* (2013.01); *G06F 17/2745* (2013.01); *G06N 3/02* (2013.01); *G06N 5/003* (2013.01); *G06N 5/04* (2013.01); *G06N 5/048* (2013.01); *G06N 7/005* (2013.01); *H04L 51/08* (2013.01); *H04L 51/20* (2013.01);
(Continued)

(58) Field of Classification Search
CPC ........... G06F 17/30867; G06F 17/2785; G06F 17/30684; G06F 17/27; G06F 17/30029; G06F 17/30312; G06F 17/20; G06F 17/30038; G06F 16/951; G06F 16/95; G06F 16/686; G06F 16/9038; G06F 16/9537; G06F 16/972; G06F 16/3322; G06F 16/58; G06F 16/5866

See application file for complete search history.

(56) References Cited

U.S. PATENT DOCUMENTS 8,655,889 B2    2/2014  Hua et al.
2009/0280783 A1*  11/2009  Klassen .............. G06F 17/3089
                                                    455/414.1
(Continued)

OTHER PUBLICATIONS

Chang, Jonathan, and Eric Sun. "Location3: How users share and respond to location-based data on social." Fifth International AAAI Conference on Weblogs and Social Media. 2011.*

(Continued)

*Primary Examiner* — Nan Hutton
(74) *Attorney, Agent, or Firm* — Procopio, Cory, Hargreaves & Savitch LLP

(57) ABSTRACT

A method of generating a caption for a social media post is provided. The method may include receiving a social media post to be posted to a social media network; collecting reference data relevant to determining common activities occurring at a category of location associated with the social media post; inferring potential topics for captions from a topic inference model, based on the collected reference data associated with the social media post; setting parameters associated with a language model based on the inferred topic; and generating at least one caption for the social media post based on the identified language model, and the inferred topic.

15 Claims, 7 Drawing Sheets

(51) Int. Cl.

| | | |
|---|---|---|
| *G06F 16/28* | (2019.01) | |
| *G06F 16/9537* | (2019.01) | |
| *G06F 16/95* | (2019.01) | |
| *G06F 17/27* | (2006.01) | |
| *G06N 5/04* | (2006.01) | |
| *H04L 12/58* | (2006.01) | |
| *H04L 29/08* | (2006.01) | |
| *G06N 3/02* | (2006.01) | |
| *G06N 5/00* | (2006.01) | |
| *G06N 7/00* | (2006.01) | |

(52) U.S. Cl.
CPC .............. *H04L 51/32* (2013.01); *H04L 67/02* (2013.01); *H04L 67/10* (2013.01); *H04L 67/16* (2013.01); *H04L 67/22* (2013.01)

(56) References Cited

U.S. PATENT DOCUMENTS

| | | | | |
|---|---|---|---|---|
| 2013/0325550 | A1* | 12/2013 | Varghese | ................ H04W 4/21 705/7.31 |
| 2017/0069000 | A1* | 3/2017 | Duleba | .............. G06Q 30/0282 |

OTHER PUBLICATIONS

Bao, Jie, Yu Zheng, and Mohamed F. Mokbel. "Location-based and preference-aware recommendation using sparse geo-social networking data." Proceedings of the 20th international conference on advances in geographic information systems. ACM, 2012.*

Preotiuc-Pietro, Daniel, and Trevor Cohn. "Mining user behaviours: a study of check-in patterns in location based social networks." Proceedings of the 5th Annual ACM Web Science Conference. ACM, 2013.*

Aker, A., et al., Generating Image Descriptions Using Dependency Relational Patterns, Proceedings of the 48th Annual Meeting of the Association for Computational Linguistics Uppsala, Sweden, Jul. 11-16, 2010, pp. 1250-1258 (9 pages).

Blei, D.M., et al., Latent Dirichlet Allocation, Journal of Machine Learning Research, 2003, 3, pp. 993-1022 (30 pages).

Blei, D.M., et al., Modeling Annotated Data, Proceedings of the 26th Annual International ACM SIGIR Conference on Research and Development in Information Retrieval, 2003, pp. 127-134 (8 pages).

Fan, X., et al., Automatic Image Captioning From the Web for GPS Photographs, MIR '10 Proceedings of the International Conference on Multimedia Information Retrieval, 2010, pp. 445-448 (4 pages).

Kiros, R., et al., Multimodal Neural Language Models, Proceedings of the 31st International Conference on Machine Learning, Beijing, China, 2014, 31, (9 pgs).

Li, H., et al., Melog—Moblie Experience Sharing Through Automatic Multimedia Blogging, MCMC '10, Firenze, Italy, Oct. 29, 2010, pp. 19-24 (6 pgs).

Mikolov, T., et al., Context Dependent Recurrent Neural Network Language Model, IEEE Workshop on Spoken Language Technology, SLT 2012—Proceedings, 2012, (6 pgs).

Mnih, A., et al., Three New Graphical Models for Statistical Language Modelling, Proceedings of the 24th International Conference on Machine Learning, Corvallis, OR, 2007, (8 pgs).

Plaza, L, et al., Improving Automatic Image Captioning Using Text Summarization Techniques, Text, Speech and Dialogue, 2010, vol. 6231 of the series Lecture Notes in Computer Science, pp. 165-172 (8 pgs).

* cited by examiner

METHOD AND APPARATUS FOR USING BUSINESS-AWARE LATENT TOPICS FOR IMAGE CAPTIONING IN SOCIAL MEDIA

BACKGROUND

Field

The present disclosure relates to social media networks, and more specifically, to systems and methods for generating captions for social media network posts.

Related Art

In related art social media networks, image and video posts have become very popular and have driven a rise of photo-centric social media. In such related art networks, captions may be an important element of image and video posts to communicate a story behind the image or video. Additionally, captions may enhance the engagement with audiences and, thus, may be important to campaigns or advertisements. However, in related art social media networks, the considerable manual efforts by users required for accurate captioning has motivated development of automatic caption generation processes. These related art automated captioning processes either rely on image content analysis or summarization of multiple web-documents related to the location of the given image.

However, content of image or video captions may often be driven by the users' activities captured in the image or video. For example, caption content may be mined and correlated to contexts specific to circumstances of the users' activities. The related art approaches do not consider activities of a user that are captured by the image or video.

SUMMARY

Aspects of the present application may include a method of generating a caption for a social media post. The method may include receiving a social media post to be posted to a social media network; collecting reference data relevant to determining common activities occurring at a category of location associated with the social media post; inferring potential topics for captions from a topic inference model, based on the collected reference data associated with the social media post; setting parameters associated with a language model based on the inferred topic; and generating at least one caption for the social media post based on the identified language model, and the inferred topic.

Further aspects of the present application may include a non-transitory computer readable medium having stored therein a program for making a computer execute a method of generating a caption for a social media post. The method may include receiving a social media post to be posted to a social media network; collecting reference data relevant to determining common activities occurring at a category of location associated with the social media post; inferring potential topics for captions from a topic inference model, based on the collected reference data associated with the social media post; setting parameters associated with a language model based on the inferred topic; and generating at least one caption for the social media post based on the identified language model, and the inferred topic.

Additional aspects of the present application may include a server apparatus configured to generate a caption for a social media post. The server apparatus may include a memory, and a processor. The processor may be configured to receive a social media post to be posted to a social media network; collect reference data relevant to determining common activities occurring at a category of location associated with the social media post; infer potential topics for captions from a topic inference model, based on the collected reference data associated with the social media post; set parameters associated with a language model based on the inferred topic; and generate at least one caption for the social media post based on the identified language model, and the inferred topic.

Still further aspects of the present application may include a server apparatus configured to generate a caption for a social media post. The server apparatus may include means for receiving a social media post to be posted to a social media network; means for collecting reference data relevant to determining common activities occurring at a category of location associated with the social media post; means for inferring potential topics for captions from a topic inference model, based on the collected reference data associated with the social media post; means for setting parameters associated with a language model based on the inferred topic; and means for generating at least one caption for the social media post based on the identified language model, and the inferred topic.

DETAILED DESCRIPTION

Figure 1:
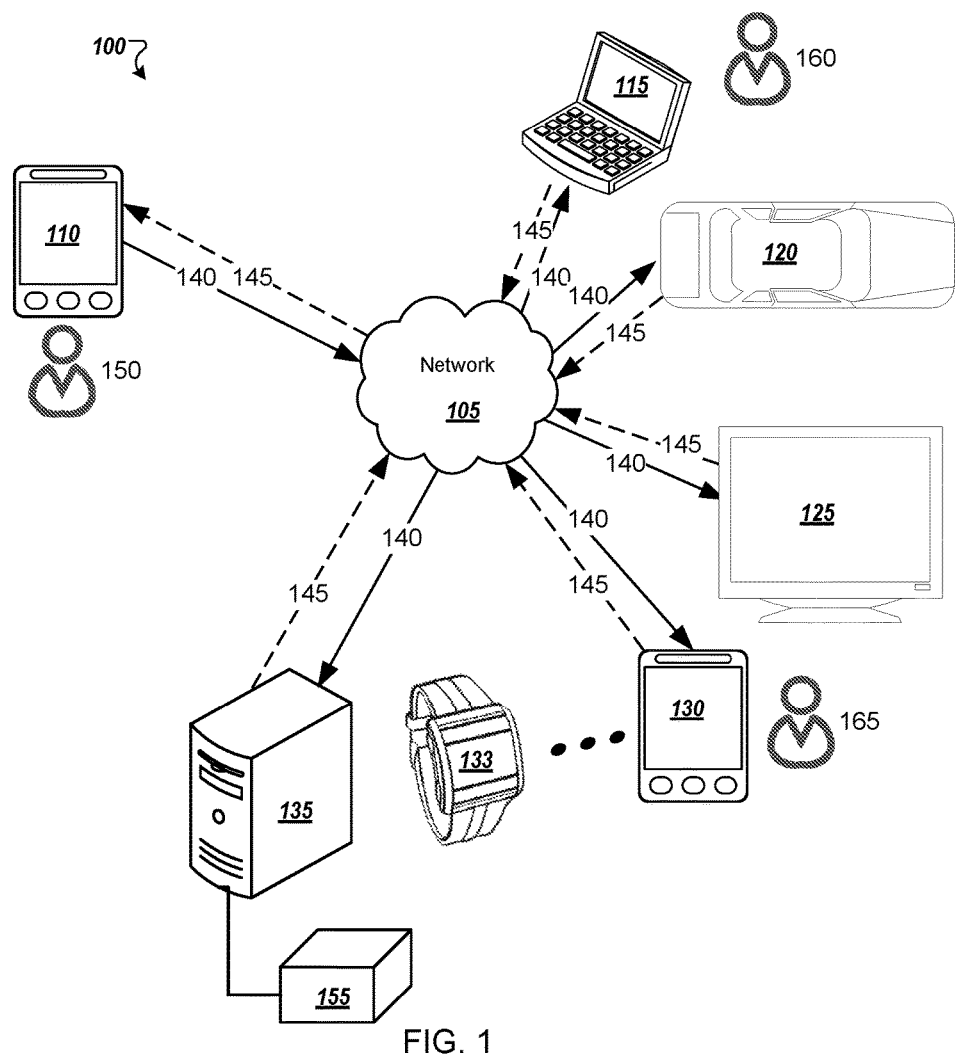
FIG. 1 illustrates a social media environment usable with example implementations of the present application.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or operator control over certain aspects of the implementation, depending on the desired implementation of one of ordinary skill in the art practicing implementations of the present application.

Business-aware latent topics may provide a new contextual cue for caption generation. By analyzing typical activities of people who posted images from businesses with similar categories, context clues for topics common to businesses in the same category may be identified for new posts. In other words, by analyzing common activities or content of captions used at businesses in similar categories, content appropriate for captions in new posts may be identified. For example, analyzing posted images of businesses in the category "fast food" may identify "burger" as a word of high probability in a topic commonly used in these posts. The topic including "burgers" could then be used to generate captions. By using such business-aware latent topics, an image captioning model may generate sentences that better reflect business activities. Use of business-aware latent topics in image caption modeling is discussed in greater detail below with respect to FIGS. 2-5.

FIG. 1 illustrates a social media environment 100 usable with example implementations of the present application. In some example implementations, the social media environment 100 may be an image or video posting social media environment. For example, but not by way of limitation, the image or video posting social media environment may include YouTube, Pinterest, Flickr, Instagram or any other image or video posting platform that may be apparent to a person of ordinary skill in the art. However, example implementations of the social media environment 100 are not limited to image or video posting social media environments, and could be any social media environment. The illustrated social media environment 100 includes a plurality of devices 110-135, communicatively connected to one another via, for example, a network 105 (e.g., by wireline and/or wireless connections).

Devices 110-135 may include, but are not limited to, a computer 115 (e.g., a laptop computing device), mobile devices 110, 130 (e.g., smartphone or tablet), a television 125, a device associated with a vehicle 120, a wearable device 133 (such as a smart watch), and a server computer 135. The devices 110-135 may have a computing environment as shown below in FIG. 7.

In some example implementations, one or more of the devices 110-135 may be associated with a user (e.g., the device 110 may be used by the user 150 to draft, edit, upload and transmit a social media post 140). For example, the device 110 associated with user 150 may transmit the social media post 140 to the social media environment 100 and be received to the other devices 115-135 associated with other respective users via the network 105. Similarly, the device 115 associated with user 160 may transmit a social media post (not shown in FIG. 1) to the social media environment 100 and have it distributed to the other devices 110, 120, 125, 130, 133, 135. Further, the device 130 associated with user 160 may transmit a social media post (not shown in FIG. 1) to the social media environment 100 and have it distributed to the other devices 110, 115, 120, 125, 133, 135.

Figure 2:
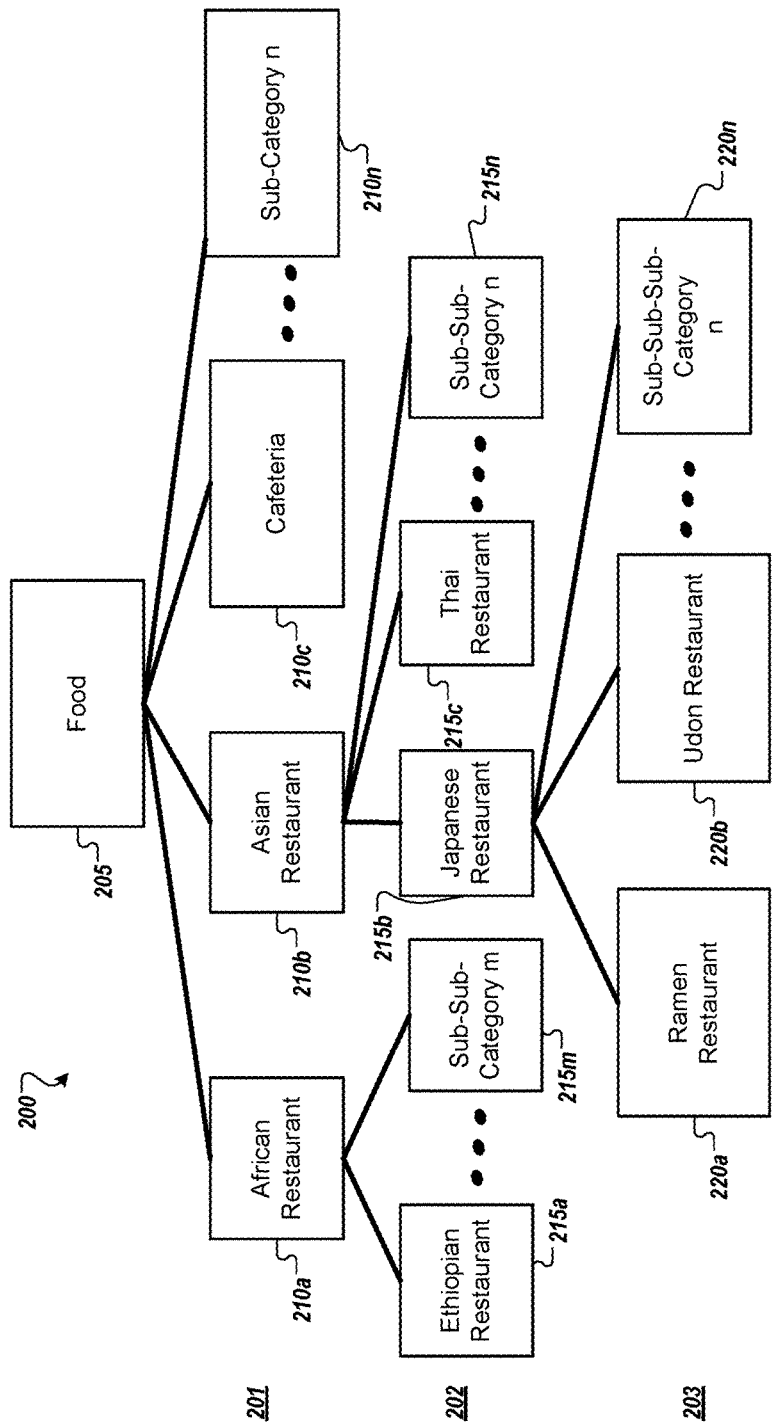
FIGS. 2 and 3 illustrate example embodiments of category trees used with example implementations of the present application.
Figure 3:
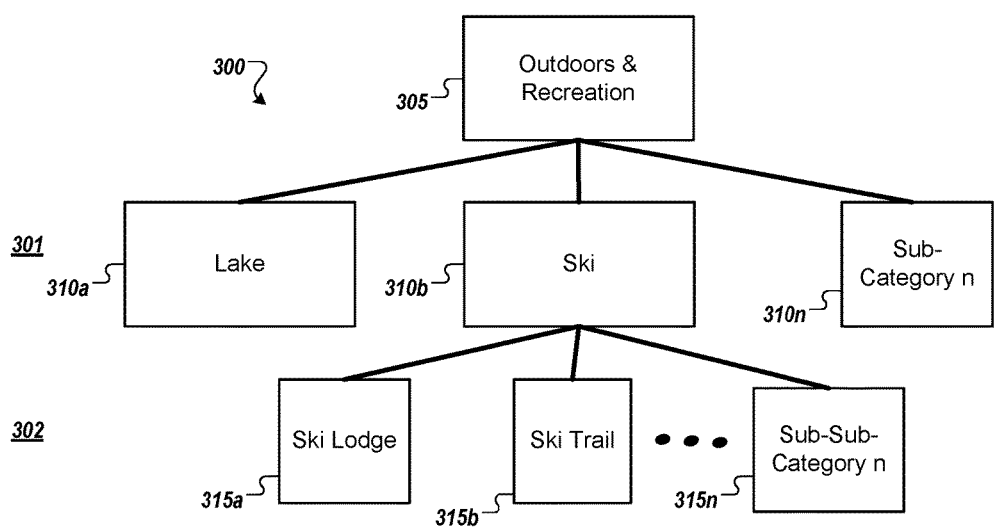

Further, each of the other devices 115-135 may optionally (indicated by broken line) be used to send a reply 145 to the social media post 140. In example implementations of the present application, at least one device 135 may also analyze the social media posts 140 by the user 150 to detect location categories (and/or business categories) and caption content associated with the social media post 140 to identify latent topics associated with the location categories (and/or business categories). Further, the processor 155 may generate category trees and correlate the latent topics with the location categories (and/or business categories) in category trees. Example implementations of category trees are illustrated in FIGS. 2 and 3 below. Using the generated category trees, the processor 155 may also suggest captions, based on the identified latent topics, determine a probability that the user 150 would purchase using processes discussed below in FIGS. 4 and 5. This analysis, detection, and generation may be performed by a processor 155 connected, associated, or integrated into the device 135.

FIGS. 2 and 3 illustrate example embodiments of category trees used with example implementations of the present application. FIG. 2 illustrates a category tree 200 for businesses categorized as relating to general category of "Food", as indicated by block 205. An example implementation of the category tree 200 illustrated in FIG. 2 may be manually created or created by analyzing business categories of locations associated with a plurality of social media posts. An example process of correlating latent topics with business categories and using the correlated latent topics is discussed in greater detail below with respect to FIGS. 4 and 5.

As illustrated in FIG. 2, the general category of "Food" may be divided into a plurality of sub-categories and sub-subcategories, arranged into a plurality of levels (201, 202, 203). For ease of explanation, the sub-categories of level 1 (201) are referred to herein as sub-categories. Further, the sub-categories of level 2 (202) are referred to herein as sub-sub-categories and the sub-categories of level 3 (203) are referred to herein as sub-sub-sub-categories. However, these terms (sub-category, sub-sub-category, and sub-sub-sub-category) are not intended to limit the number of levels to 3 and a general category may be divided into more than three levels or less than three levels, as may be apparent to a person of ordinary skill in the art.

As illustrated, the category "Food" is divided into a plurality of sub-categories represented by blocks 210a ("African Restaurant"), 210b ("Asian Restaurant"), and 210c ("Cafeteria") in level 1 (201). Additional sub-categories (represented by block 210n) could also be provided under the general category of "Food."

Further, each sub-category 210a, 210b, 210c, 210n may further be divided into sub-sub-categories represented below the sub-category blocks 215a, 215b, 215c at level 2 (202). For example, sub-category 210a ("African Restaurant") may be divided into sub-sub-category 215a ("Ethiopian Restaurant"). Other sub-sub-categories 215m ("Sub-Sub-Category m") may also be provided under sub-category 210a.

Similarly, sub-category 210b ("Asian Restaurant") may be divided into sub-sub-categories 215b ("Japanese Restaurant") and sub-sub-category 215c ("Thai Restaurant"). Other sub-sub-categories 215n may also be provided under sub-category 210b. Though not illustrated in FIG. 2, other sub-sub-categories may be provided under the other sub-categories 210c-210n. Further, expanding in this manner may allow a category tree 200 (or other model) model to take the advantage of the correlation between the other similar types of business under the same parent categories. For example, information about sub-sub-category 215b ("Japanese Restaurant") could be shared with sub-sub-category 215c ("Thai Restaurant") because they share the same parent sub-category (i.e., sub-category 210b "Asian Restaurant").

Further, each sub-sub-category 215a, 215b, 215c, 215m, 215n may be divided into sub-sub-sub-categories 220a, 220b, 220n at level 3 (203). For example, sub-sub-category 215b ("Japanese Restaurant") may be divided into sub-sub-sub-category 220a ("Ramen Restaurant") and sub-sub-sub-category 220b ("Udon Restaurant"). Other sub-sub-sub-categories 220n ("Sub-Sub-Sub-Category n") may also be provided under sub-sub-category 220n. Though not illustrated in FIG. 2, other sub-sub-sub-categories may be provided under the other sub-sub-categories 215a, 215m, 215c, 215n.

Various terms may be associated with each category (including the general category, the sub-categories, sub-sub-categories, sub-sub-sub-categories) based on the terms in captions being used in social media posts associated with locations classified into each category (or sub-category, sub-sub-category, sub-sub-sub-category under the category in the category tree 200). For example, terms in captions associated with sub-sub-sub-categories 220*a* ("Ramen Restaurant") and 220*b* ("Udon Restaurant") may be associated with sub-sub-category 215*b* ("Japanese Restaurant") because these terms are used in captions of social media posts captured at locations falling within the sub-sub-category 215*b* ("Japanese Restaurant"). Additional terms may be associated with each category (or sub-category, sub-sub-category, sub-sub-sub-category under the category in the category tree 200), and two are only provided for illustration purposes. As would be apparent to a person of ordinary skill in the art, it is conceivable that certain terms may be associated with multiple sub-sub-categories because the terms being used in captions associated with images or videos captured at different locations falling within different categories.

The terms in the captions and the associated categories of the category tree 200 may then be used to train latent topic-based predictive models. A latent topic may be a set of terms, each term having a probability indicative of the term's relevance to the topic. By associating latent topics with categories of location or business (e.g., location categories or business categories), the latent topic model may be more indicative of common user behavior at the locations or businesses within the associated location or business categories. Once trained, the latent topic model may then be used to generate a distribution of latent topics based on the distribution of terms of each latent topic and the words in any given reference text. The latent topics generated by the reference text of social media posts may then be used to predict captions for the social media posts.

Though FIG. 2 illustrates four "levels" of differentiation (i.e. General category (e.g., "Food"), Sub-Category (e.g., "Asian Restaurant"), Sub-Sub-Category (e.g., "Japanese Restaurant"), Sub-Sub-Sub-Category (e.g., "Ramen Restaurant")), a person of ordinary skill in the art will recognize that more or less levels of differentiation may be used in the category tree 300, as illustrated in FIG. 3.

FIG. 3 illustrates a category tree 300 for business categorized as relating to general category of "Outdoors & Recreation", as indicated by block 305. As discussed above, a category tree 300 as illustrated in FIG. 3 may be manually created or created analyzing location categories associated with the social media posts. An example process of correlating latent topics with location categories and using the correlated latent topics is discussed in greater detail below with respect to FIGS. 4 and 5.

As illustrated in FIG. 3, the general category of "Outdoors & Recreation" may be divided into a plurality of sub-categories, arranged in a plurality of levels (301, 302). For ease of explanation, the sub-categories of level 1 (301) are referred to herein as sub-categories. Further, the sub-categories of level 2 (302) are referred to herein as sub-sub-categories. However, these terms (sub-category and sub-sub-category) are not intended to limit the number of levels to two and a general category may be divided into more than two levels or less than two levels, as may be apparent to a person of ordinary skill in the art.

As illustrated, the category "Outdoors & Recreation" is divided into a plurality of sub-categories represented by blocks 310*a* ("Lake"), and 310*b* ("Ski"). Additional sub-categories (represented by block 310*n*) could also be provided under the general category of "Outdoors & Recreation." Further, each sub-category 310*a*, 310*b*, 310*n* may further be divided into sub-sub-categories represented below the sub-category blocks 315*a*, 315*b*, at level 2 (302). For example, sub-category 310*b* ("Ski" locations) may be divided into sub-sub-categories 315*a* ("Ski Lodge") and sub-sub-category 315*b* ("Ski Trails"). Other sub-sub-categories 315*n* ("Sub-Sub-Category n") may also be provided under sub-category 310*b*.

Various terms may be associated with each category (including the general category, the sub-categories, sub-sub-categories) based on the terms being used in captions being used in social media posts associated with locations classified into each category (or sub-category and/or sub-sub-category under the category in the category tree 300). For example, terms associated with sub-sub-categories 315*a* ("Ski Lodge") and 315*b* ("Ski Trail") may be associated with sub-category 310*b* ("Ski") because these terms are used in captions of social media posts captured at locations falling within the sub-category 310*b* ("Ski"). Additional terms may be associated with each category (or sub-category, sub-sub-category, sub-sub-sub-category under the category in the category tree 300), and two are only provided for illustration purposes. As would be apparent to a person of ordinary skill in the art, it is conceivable that certain terms may be associated with multiple sub-sub-categories because the terms being used in captions associated with images or videos captured at different locations fall within different categories.

Again, the terms in the captions and the associated categories of the category tree 300 may then be used to train latent topic based predictive models. A latent topic may be a set of terms, each term having a probability indicative of the term's relevance to the topic. By associating latent topics with categories of location or business (e.g., location categories or business categories), the latent topic model may be more indicative of common user behavior at the locations or businesses within the associated location or business categories. Once trained, the latent topic model may then be used to generate a distribution of latent topics based on the distribution of terms of each latent topic and the words in any given reference text. The latent topics generated by the reference text of social media posts can then be used to predict captions for the social media posts.

Though FIG. 3 illustrates three "levels" of differentiation (i.e. General category (e.g., "Outdoors & Recreation."), Sub-Category (e.g., "Ski"), and Sub-Sub-Category (e.g., "Ski Lodge")), a person of ordinary skill in the art will recognize that more or less levels of differentiation may be used in the category tree 300.

Figure 4:
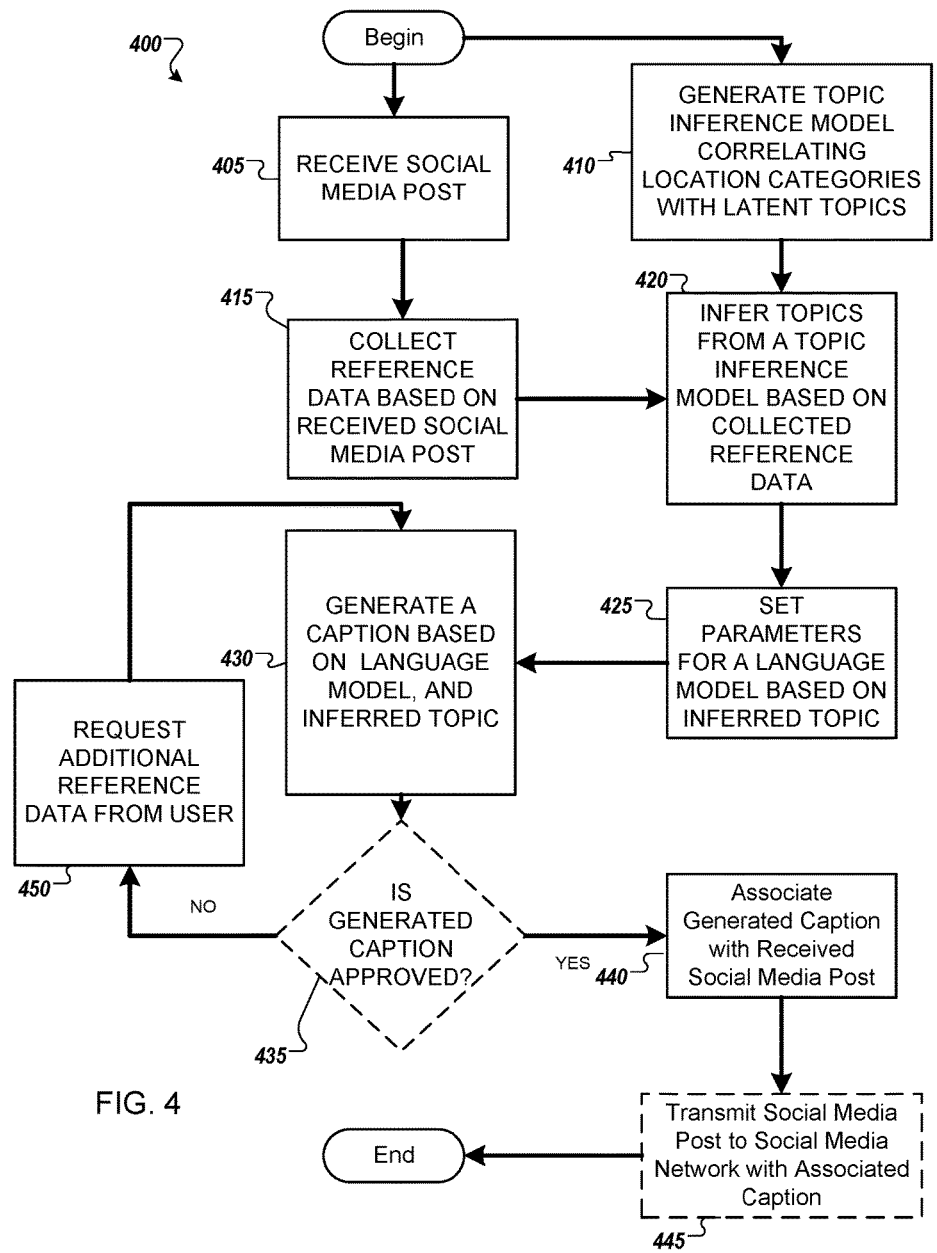
FIG. 4 illustrates an example flow diagram of a process for providing automatic captioning of social media posts according to example implementations of the present application.

FIG. 4 illustrates an example flow diagram of a process 400 for providing automatic captioning of social media posts according to example implementations of the present application. The illustrated process 400 may be used by a processor (such as processor 155) of a device (such as device 135) to generate captions for social media posts. In process 400, a social media post is received at 405. The social media post may be an image, an audio recording, a video recording, a text string, a document, or any other type of electronic data capable of being shared within a social network that may be apparent to a person of ordinary skill in the art. The social media post may be received by email, Short Message Service (SMS), instant message, application upload, browser upload, or any other file transfer process that may be apparent to a person of ordinary skill in the art.

After the social media post is received, reference data, which could be used to identify activities commonly occurring at a location category associated with the social media post, is collected at 415. In some implementations, the social media post may be associated with a location that belongs in multiple categories (such as both a bakery and a café). In some example implementations, the reference data may be text or other descriptive matter of activities that commonly occur at a particular category of location. For example, text descriptions or captions of other social media posts captured at locations in the same location category may be collected to be used to identify common activities occurring at the associated location categories. Other types of reference data could include at the same locations, descriptions of the location and description of the location category description. Other types of reference data which could be used to identify activities commonly occurring at a location category associated with the social media post may be apparent to a person of ordinary skill in the art. These identified commonly occurring activities may be used to infer latent topics using latent topic models as discussed below.

In some example implementations, the location category associated with the social media post may be collected from others by analyzing metadata associated with the social media post to determine the conditions (e.g., location) under which the social media post was created. For example, the metadata associated with the social media post may be collected and analyzed to identify one or more of a business location category, a location name, a location address, GPS data, a location description or any other information that could be used to determine a location category associated with the location where a social media post was authored or captured that may be apparent to a person of ordinary skill in the art. In some example implementations, the reference data may vary based on the type of social media post received. For example, image posts may have different reference data than text or video posts.

Based on the determined conditions under which the social media post was created, reference data relevant to determining a location category associated with the social media post may be determined by consulting public or private databases of categories associated with known locations. For example, a database categorizing locations into restaurants, gyms, shopping centers, etc. may be used to collect location categories associated with the social media post.

In some other example implementations, the content of the social media post may be analyzed to determine the conditions (e.g., location) under which the social media post was created. For example, one or more of text recognition, voice recognition, object recognition, and any other recognition techniques that may be apparent to a person of ordinary skill in the art may be applied to the social media post to identify a location where the social media post was authored or captured. Based on the determined conditions under which the social media post was created, a location category associated with the social media post may be determined by consulting public or private databases of categories associated with known locations. For example, a database categorizing locations into restaurants, gyms, shopping centers, etc. may be used to collect location categories associated with the social media post.

Figure 5:
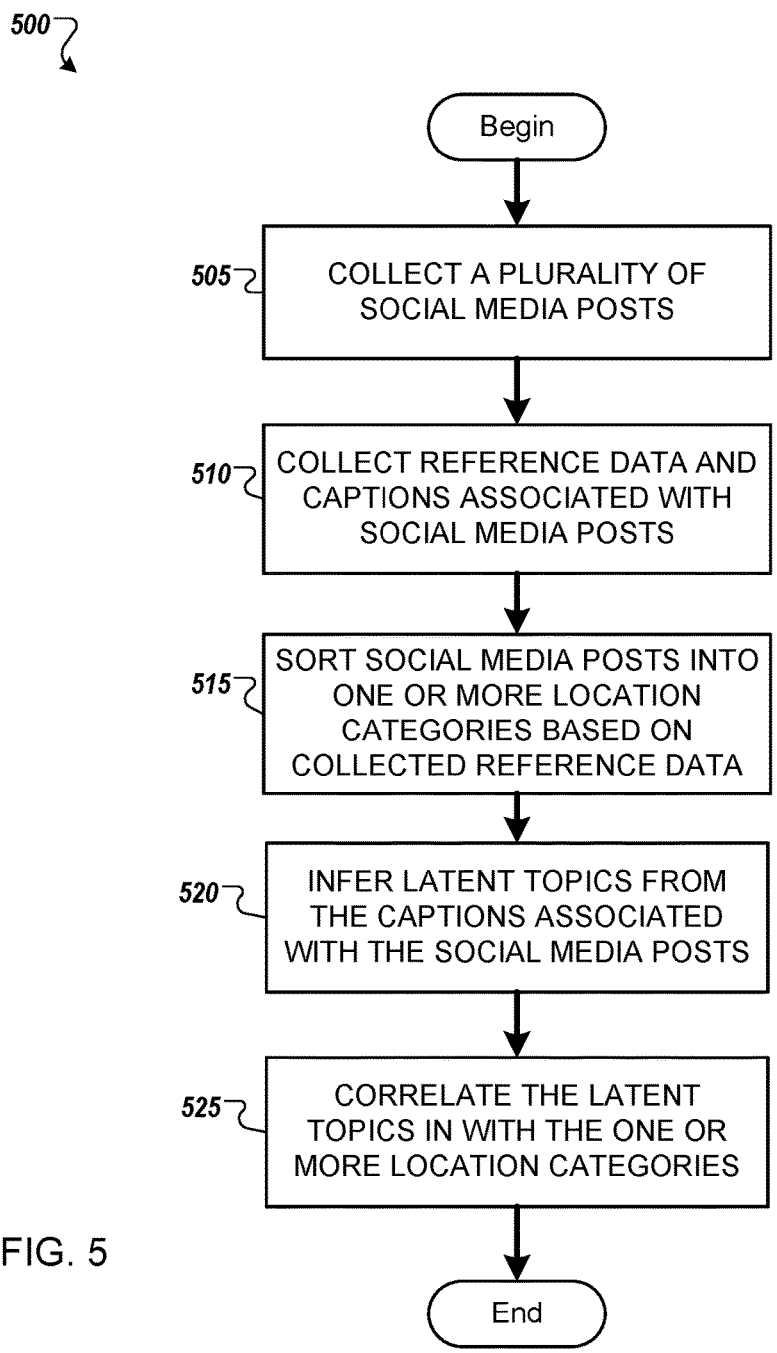
FIG. 5 illustrates an example flow diagram of a process for generating a topic inference model according to an example implementation of the present application.

In parallel with the receiving the social media post at 405 and collecting the reference data at 415, a topic inference model correlating location categories with latent topics is generated in 410. In some example implementations, the topic inference model may be generated prior to the social media post being received at 405. In other example implementations, the topic inference model may be generated after the reference data is collected at 415. In still other example implementations, the topic inference model may be generated after the social media post is received at 405 but before the reference data is collected at 415. FIG. 5 discussed in greater detail below describes an example implementation of a process of generating the inference model in 410.

After the reference data has been collected at 415 and the topic inference model has been generated at 410, the topic inference model is used to infer topics for use in generating captions based on the collected reference data at 420. In other words, the reference data relevant to determining common activities occurring at a location category associated with the social media post is used in combination with the topic inference model, which correlates location or business categories with latent topics to infer or identify latent topics that may be associated with the social media post at 420. For example, if a social media post is determined to be associated with location information indicative of a "fast food restaurant," topics relating to "burgers," "French fries," and "milkshakes" may be identified.

After topics have been inferred at 420, parameters of a language model to be used for caption generation are set based on inferred topics in 425. The parameters may be represented by the distribution of latent topics generated by reference texts using latent topic model. For example, assuming there are 200 latent topics in a latent topic model, the reference text may be used to assign different probability values for each of the 200 latent topics. The probability values of some topics may be higher if the terms highly relating to the topics occur frequently in the reference text. Similarly, other topics may receive lower probability values if terms highly relating to topics occur rarely in the reference text. The distribution of the 200 latent topics determined based on the reference text is then used as context parameters of the language model to generate captions.

In some example implementations, the language model may be a neural network that has been trained using captions of social media posts with check-ins at locations or venues associated with certain topics or location categories. In other words, a neural network may be trained with captions collected from check-ins by users at locations in different location categories using various caption topics. Based on the captions provided to the neural networks, the neural networks may determine probabilities that certain words or phrases would precede, follow, or be in close proximity to other words or phrases depending on business categories.

For example, a neural network may determine that words like "ketchup," "mayo," and "pickles" may have a high probability of being used in close proximity with the latent topics related to "burger" and/or "French Fries" or "Fast food" location category posts. Conversely, a neural network may determine that words like "ketchup," "mayo," and "pickles" may have a low probability of being used in close proximity with the latent topics related to "Ramen" and/or "Udon" or "Asian food" location category posts.

In some example implementations, the language model may be a feed-forward neural network that makes linear predictions of a next word representation to compute probability of a sequence of words based on the context features provided to the neural network. Again, if the latent topics are inferred at 420, a language model trained with posts may be biased based on the latent topics inferred for use in generating the caption.

At 430, the identified language model is used to generate a caption based on the reference data relevant to determining common activities occurring at a location category and the inferred topics. In some example implementations, the inferred topics associated with location categories are used as contextual features fed into the neural network to calculate probabilities of next word representations of a sequence of words to produce a potential caption to be associated with the social media post. In some example implementations, multiple captions may optionally be generated simultaneously (e.g., in parallel).

Once the caption has been generated by the language model, the generated caption may optionally be submitted to a user for approval prior to posting at 435. The caption may be displayed to the user on a UI, or may be sent to the user by an email, SMS message, instant message, or any other transmission mechanism that may be apparent to a person of ordinary skill in the art. If multiple captions have been generated, all of the captions may optionally be submitted to user and the user may be provided with an option of choosing, which caption should be used. In some example implementations, the process 400 may omit the determination at 435 and proceed directly to 440 discussed below.

If the user does not approve the caption (435—NO) a request for additional reference data may be sent to the user at 450. The request may be displayed to the user on a UI, or may be sent to the user by an email, SMS message, instant message, or any other transmission mechanism that may be apparent to a person of ordinary skill in the art. After the request is transmitted, the process 400 may return to 430 to generate a new (e.g., second) caption that may be using any additional reference data received from the user in response to the request and the new caption generated may again optionally be submitted to a user for approval prior to posting at 435 and repeated until the user approves of the caption as discussed below. In this manner, multiple captions may be generated in series.

Once the user approves the caption (435—YES), the caption may be associated with the social media post at 440. Once the caption has been associated with the social media post, both the caption and the social media post may optionally be transmitted to a social media network at 445, and the process 400 may end. In some example implementations, process 400 may end after the caption has been associated with the social media post at 440 and the block 445 may be omitted.

FIG. 5 illustrates an example flow diagram of a process 500 for generating a topic inference model according to an example implementation of the present application. The illustrated process 500 may be used by a processor (such as processor 155) of a device (such as device 135) to generate a topic inference model in accordance with block 410 of the process 400 for generating captions for social media posts illustrated in FIG. 4. In process 500, a plurality of social media posts are collected by crawling through social media networks at 505. The social media network may be photo sharing social media networks, video sharing social media networks, check-in based social media networks, or any other type of social media networks that may be apparent to a person of ordinary skill in the art. The collected social media posts may be images, audio recordings, videos recordings, text strings, documents, or any other type of electronic data that have been shared within a social network that may be apparent to a person of ordinary skill in the art.

After the plurality of social media posts are collected from social media networks, reference data, which could be used to identify location category or are relevant to determining a location category, and captions associated with each social media post are collected at 510. In some example implementations, the reference data may be collected by analyzing metadata associated with a social media post to determine the conditions (e.g., location) under which the social media post was created.

For example, the metadata associated with the social media post may be collected and analyzed to identify one or more of a business location category, a location name, a location address, GPS data, a location description or any other information that could be used to determine a location category associated with the location where a social media post was authored or captured that may be apparent to a person of ordinary skill in the art. In another example implementation, the reference data could be text describing or identifying the location category associated with the location of where the social media post was captured. In some example implementations, the reference data may vary based on the type of social media post received. For example, image posts may have different reference data than text or video posts.

Based on the determined conditions under which the social media post was created, reference data relevant to determining a location category associated with each social media post may be determined by consulting public or private databases of categories associated with known locations. For example, a database categorizing locations into restaurants, gyms, shopping centers, etc. may be used to collect location categories associated with each social media post.

In some other example implementations, the content of each social media post may be analyzed to determine the conditions (e.g., location) under which each social media post was created. For example, one or more of text recognition, voice recognition, object recognition, and any other recognition techniques that may be apparent to a person of ordinary skill in the art may be applied to the social media post to identify a location where the social media post was authored or captured. Based on the determined conditions under which each social media post was created, reference data relevant to determining a location category associated with each social media post may be determined by consulting public or private databases of categories associated with known locations. For example, a database categorizing locations into restaurants, gyms, shopping centers, etc. may be used to collect location categories associated with each social media post.

Once reference data and captions associated with each of the plurality of social media posts are collected, the social media posts and the associate captions are sorted into one or more location categories based on the collected reference data relevant to determining a location category at 515. FIGS. 2 and 3 illustrate examples of location categories into which each social media post may be sorted.

After the social media posts have been sorted into the location categories, topics associated with each social media post may be inferred from the captions associated with the social media posts at 520. For example, latent topic models may be used to infer one or more topics of each caption associated with each social media post. Based on the topics inferred from the captions, latent topics associated with the social media posts may be inferred using latent topic models. Other processes may be used to infer latent topics of each caption.

The latent topics may be correlated to the one or more location categories based on the sorting of the social media posts in 525. FIGS. 2 and 3 may represent example implementations of category trees that may be used to correlate the latent topics with one or more location categories in 525. Though illustrated as sequential processes in FIG. 5, the processes of 520 and 525 are not limited to being formed sequentially. In some example implementations, the processes of 520 and 525 may be performed simultaneously. In some example implementations, location categories and latent topics in captions may be correlated by Correspondence (Con) Latent Dirichlet Allocation (LDA) generative models to learn the joint distribution of location categories and captions. Using larger volumes of data to train the topic models may help alleviate data sparsity and ensures the latent topics better correspond to relevant business venue categories.

The correspondence between location categories and latent topics can then be used in the process 400 of FIG. 4 to generate captions based on newly received social media posts as discussed above.

Example Caption Generation Evaluation Results

A Bilingual Evaluation Understudy algorithm (BLEU-1) was used measure of how well the terms in two text strings match, to compare captioning performance. Results of that evaluation are shown in Table 1 below. The bold numbers in Table 1 highlight the two single contexts that obtain the highest BLEU-1 score. For the four single contexts in Table 1, the location category or business aware latent topics (Topics) have more stable contributions over the different general business categories. The latent topics are highlighted contexts for all but one of the general business categories. The consistent improvement might be attributed to the location category or business awareness incorporated in the topic modeling.

Overall, the models using the multiple contexts that combine latent topic contexts with image context and time context performed the best for most of the business venue categories compared to any of the single contexts. The numbers in parentheses (i.e., "( )") in Table 1 indicate the relative improvements of the multiple-context model compared to Baseline and Image, respectively. Compared to Baseline, six out of the eight business categories obtain at least 12% relative improvement from the multiple-context models.

It should be noted that, though there would be the other ways to collect reference texts of the input image (e.g., the captions associated with visually similar images or similar business categories), the example implementation uses the other image captions posted at the same venue of the input image as the reference texts and thus also takes advantage of location information. Location-based image captioning in the past has summarized captions for the images collected at the same location. A problem with this related art approach has been that not every location has sufficient relevant captions unless the locations are famous travel landmarks.

Therefore, by utilizing common user activities at businesses and categories of locations as the indicators, the data sparsity problem of individual locations may be avoided. As illustrated, the results of "GPS" in Table 1 show that solely relying on location information is not sufficient, while location category or business aware topics ("Topics") that use the benefits from the patterns across business venue or location categories performs better.

TABLE 1

| top-layer business | Baseline [5] | Image [1] | CPS | Time | Topics | Multiple | | |
|---|---|---|---|---|---|---|---|---|
| Food | 0.0961 | 0.0933 | 0.1007 | 0.0998 | 0.1002 | 0.1075 | (+12%) | (+15%) |
| Outdoor & Recreation | 0.0942 | 0.1069 | 0.1040 | 0.1036 | 0.1106 | 0.1185 | (+26%) | (+11%) |
| College & University | 0.0974 | 0.0988 | 0.1109 | 0.1037 | 0.0996 | 0.0993 | (+2%) | (+1%) |
| Art & Entertainment | 0.0947 | 0.1022 | 0.0995 | 0.1021 | 0.1043 | 0.1087 | (+15%) | (+6%) |
| Nightlife Spot | 0.0949 | 0.1013 | 0.0975 | 0.0948 | 0.1041 | 0.1075 | (+13%) | (+6%) |
| Professional & Others | 0.0951 | 0.1045 | 0.0983 | 0.1029 | 0.1102 | 0.1109 | (+17%) | (+6%) |
| Shop & Service | 0.0985 | 0.0975 | 0.1023 | 0.0942 | 0.1028 | 0.1035 | (+5%) | (+6%) |
| Travel & Transportation | 0.0895 | 0.1143 | 0.1080 | 0.1066 | 0.1096 | 0.1180 | (+32%) | (+3%) |

As illustrated, image content (Image) is effective for the "Travel" and "Outdoor" locations, but is not as helpful for "Food" and "Shop" image content, possibly due to the limited consistency between the visual representations and the associated captions. In other words, image content may more reliably predict captions for social media posts associated with "Travel" and "Outdoor" locations than social media posts associated with "Food" and "Shop" locations because "Travel" and "Outdoor" categories have more consistency between visual representations (e.g., pictures of common travel locations or outdoor locations) and captions. This may be due to a greater variety of activities being captioned about in social media posts associated with "Food" and "Shop" locations (e.g., eating a variety of different foods, shopping for a variety of goods, etc.).

The time context appears less informative for the categories where the primary location involves indoor activities such as shops, bars, and restaurants. Overall, the effectiveness of the single-context models is more business-dependent relative to location category or business aware latent topics and that suggests location category or business awareness is helpful for representing contexts for captioning. Additionally, this shows that the incorporation of category labels in our topic modeling allows us to effectively model and represent a range of user activities.

Further, the use of the business-aware venue categories was also compared with general topics learned by standard LDA without the category labels and the business-aware topics modeled by Corr-LDA using the business venue categories as the labels. In the test stage, both methods use image captions posted at the same venue as the reference texts.

Figure 6:
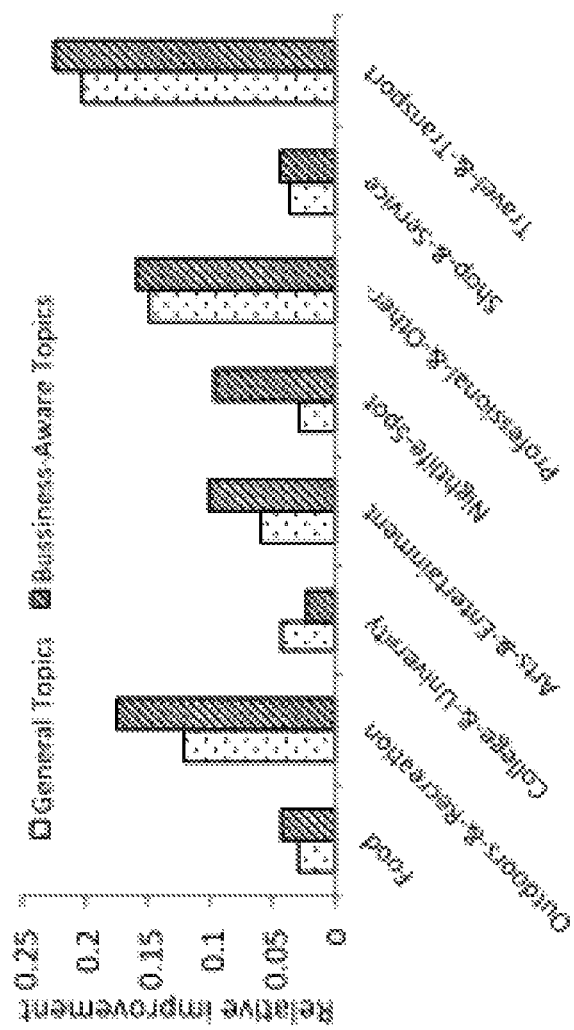
FIG. 6 is a graph illustrating a relative improvement by using the general topics and the business-aware topics compared to the baselines.

FIG. 6 is a graph illustrating a relative improvement by using the general topics and the business-aware topics compared to the baselines. The results of using the general topics could reflect whether the topic distributions in the texts collected from the same check-in venue are consistent.

The results of the business or location category aware topics emphasize the improvement as the topics are business-relevant. In most business venue or location categories, the caption generation shows more relative improvement of BLEU-1 from business-aware topics than general topics, which may illustrate an extra benefit from business awareness. Thus, by using business venue or location categories more accurate captions may be automatically generated. For example, if a detected general category of image post indicates that the post is associated with cars, a variety of potential caption topics could be possible (e.g., post could relate to an accident, current traffic conditions, purchasing of a car, etc.) Conversely, if a detected business venue or location category indicates that the image post is associated with a car dealership, certain potential caption topics become more likely (e.g., the post likely relates to purchasing a car). Similarly, if a detected business venue or location category indicates that the image post is associated with a highway or road, different potential caption topics become more likely (e.g., the post more likely relates to traffic conditions or an accident).

Though example experimental results have been discussed herein, the above discussed experimental results are provided for illustrative purposes, and example implementations of the present application need not achieve any of the illustrated improvements or efficiencies, or any other improvement or efficiency.

Example Computing Environment

Figure 7:
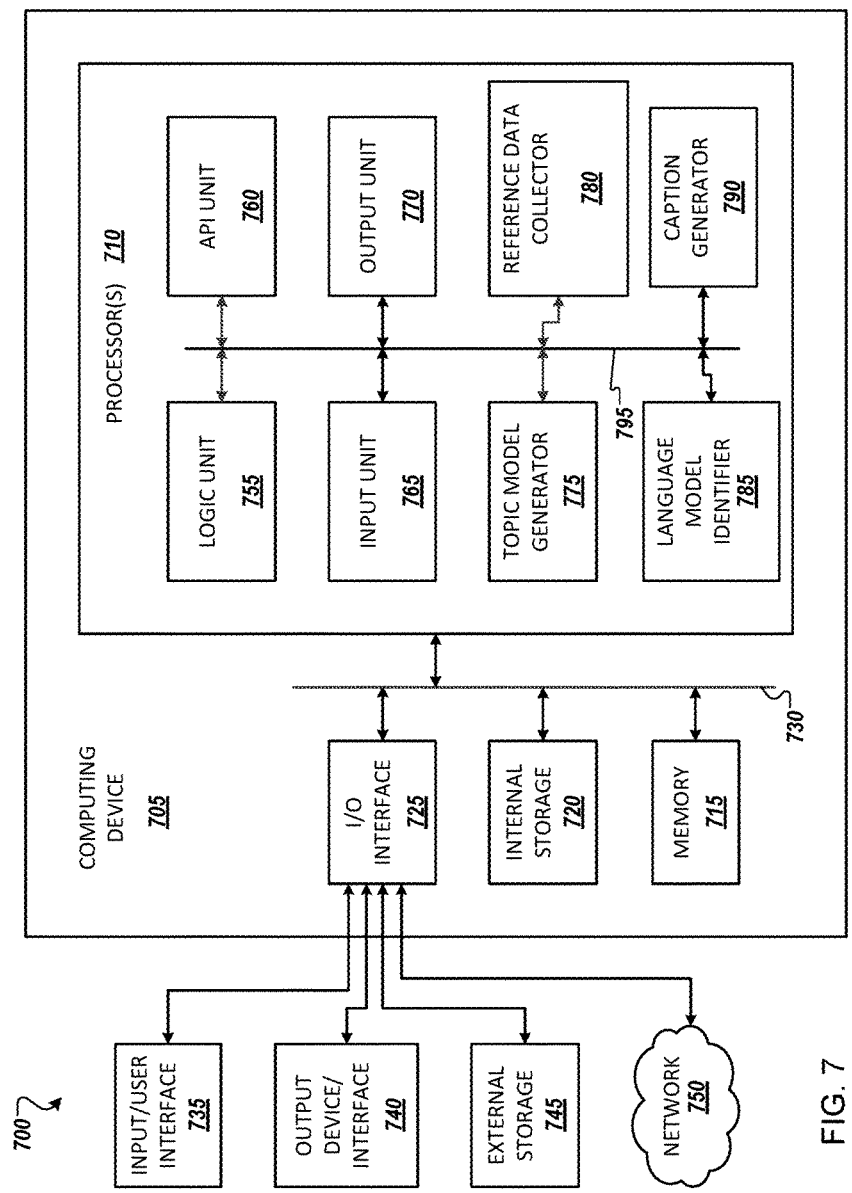
FIG. 7 illustrates an example computing environment with an example computer device suitable for use in some example implementations.

FIG. 7 illustrates an example computing environment 700 with an example computing device 705 suitable for use in some example implementations. Computing device 705 in computing environment 700 can include one or more processing units, cores, or processors 710, memory 715 (e.g., RAM, ROM, and/or the like), internal storage 720 (e.g., magnetic, optical, solid state storage, and/or organic), and/or I/O interface 725, any of which can be coupled on a communication mechanism or bus 730 for communicating information or embedded in the computing device 705.

Computing device 705 can be communicatively coupled to input/user interface 735 and output device/interface 740. Either one or both of input/user interface 735 and output device/interface 740 can be a wired or wireless interface and can be detachable. Input/user interface 735 may include any device, component, sensor, or interface, physical or virtual, which can be used to provide input (e.g., buttons, touch-screen interface, keyboard, a pointing/cursor control, microphone, camera, braille, motion sensor, optical reader, and/or the like). Output device/interface 740 may include a display, television, monitor, printer, speaker, braille, or the like. In some example implementations, input/user interface 735 and output device/interface 740 can be embedded with or physically coupled to the computing device 705. In other example implementations, other computing devices may function as or provide the functions of input/user interface 735 and output device/interface 740 for a computing device 705.

Examples of computing device 705 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, server devices, other computers, information kiosks, televisions with one or more processors embedded therein and/or coupled thereto, radios, and the like).

Computing device 705 can be communicatively coupled (e.g., via I/O interface 725) to external storage 745 and network 750 for communicating with any number of networked components, devices, and systems, including one or more computing devices of the same or different configuration. Computing device 705 or any connected computing device can be functioning as, providing services of, or referred to as a server, client, thin server, general machine, special-purpose machine, or another label.

I/O interface 725 can include, but is not limited to, wired and/or wireless interfaces using any communication or I/O protocols or standards (e.g., Ethernet, 802.11x, Universal System Bus, WiMAX, modem, a cellular network protocol, and the like) for communicating information to and/or from at least all the connected components, devices, and network in computing environment 700. Network 750 can be any network or combination of networks (e.g., the Internet, local area network, wide area network, a telephonic network, a cellular network, satellite network, and the like).

Computing device 705 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 705 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C#, Java, Visual Basic, Python, Perl, JavaScript, and others).

Processor(s) 710 can execute under any operating system (OS) (not shown), in a native or virtual environment. One or more applications can be deployed that include logic unit 755, application programming interface (API) unit 760, input unit 765, output unit 770, topic model generator 775, reference data collector unit 780, language model identifier unit 785, caption generator unit 790, and inter-unit communication mechanism 795 for the different units to communicate with each other, with the OS, and with other applications (not shown). For example, topic model generator 775, reference data collector unit 780, language model identifier unit 785, and caption generator unit 790 may implement one or more processes shown in FIGS. 4-5. The described units and elements can be varied in design, function, configuration, or implementation and are not limited to the descriptions provided.

In some example implementations, when information or an execution instruction is received by API unit 760, it may be communicated to one or more other units (e.g., logic unit 755, input unit 765, output unit 770, topic model generator 775, reference data collector unit 780, language model identifier unit 785, and caption generator unit 790). For example, when a social media post is received via the input unit 765, the reference data collector unit 780 may analyze the post to collect the reference data. Further, the topic model generator 775 may generate one or more latent topic models based on a plurality of social media posts and captions associated with the social media posts. Additionally, after the reference data collector unit 780 collects the reference data, and the topic model generator 775 generates a latent topic model, the language model identifier 785 may identify a language model to be used to generate a caption. Based on the identified language model, the collected reference data, and the latent topic model, the caption generator 790 may generate a caption for the received social media post that can be output using the output unit 770.

In some instances, the logic unit 755 may be configured to control the information flow among the units and direct the services provided by API unit 760, input unit 765, output unit 770, topic model generator 775, reference data collector unit 780, language model identifier unit 785, and caption generator unit 790 in some example implementations described above. For example, the flow of one or more processes or implementations may be controlled by logic unit 755 alone or in conjunction with API unit 760.

Although a few example implementations have been shown and described, these example implementations are provided to convey the subject matter described herein to people who are familiar with this field. It should be understood that the subject matter described herein may be implemented in various forms without being limited to the described example implementations. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

We claim:

1. A method of generating a caption for a social media post:
   receiving a social media post to be posted to a social media network;
   collecting reference data indicative of activities commonly occurring at a category of location associated with the social media post;
   inferring potential topics for captions from a topic inference model, based on the activities commonly occurring at a category of location indicated by the collected reference data associated with the social media post by extracting data indicative of the commonly occurring activities at the category of location from the social media post using one or more of image recognition, text recognition, audio recognition;
   setting parameters associated with a language model based on the inferred topic;
   generating at least one caption for the social media post based on the identified language model and the inferred topic;
   generating the topic inference model based on a reference data associated with a plurality of collected social media posts, and captions associated with the plurality of collected social media posts;
   wherein generating the topic inference model comprises:
   collecting the reference data and the captions associated with the plurality of collected social media posts;
   sorting the plurality of collected social media posts into one or more location categories based on the associated reference data;
   extracting latent topics from the captions associated with the social media posts; and
   correlating the extracted latent topics with one or more location categories into which the plurality of collected social media posts are sorted.

2. The method of claim 1, further comprising:
   transmitting the social media post to a social media network with the generated caption.

3. The method of claim 1, further comprising:
   transmitting the generated at least one caption to a user prior to transmitting the social media post to a social media network,
   transmitting the social media post to a social media network based on receiving an approval of the generated at least one caption from the user.

4. The method of claim 3, further comprising:
   transmitting a request for additional reference data to the user based on not receiving an approval of the generated at least one caption from the user; and
   generating a second caption for the social media post based on the identified language model, the inferred topic, and additional reference data received from the user.

5. The method of claim 1, wherein the collected reference data associated with the social media post comprises one or more of: a textual description relevant to common user activities at one or more locations, a textual description relevant to common user activities at one or more location categories, a location description and a location category description.

6. A non-transitory computer readable medium having stored therein a program for making a computer execute a method of generating a caption for a social media post, said program including computer executable instructions for performing the method comprising:
   receiving a social media post to be posted to a social media network;
   collecting reference data indicative of activities commonly occurring at a category of location associated with the social media post;
   inferring potential topics for captions from a topic inference model, based on the activities commonly occurring at a category of location indicated by the collected reference data associated with the social media post by extracting data indicative of the commonly occurring activities at the category or location from the social media post using one or more of image recognition, text recognition, audio recognition;
   setting parameters associated with a language model based on the inferred topic;
   generating at least one caption for the social media post based on the identified language model, and the inferred topic;
   generating the topic inference model based on a reference data associated with a plurality of collected social media posts, and captions associated with the plurality of collected social media posts;
   wherein generating the topic inference model comprises:
   collecting the reference data and the captions associated with the plurality of collected social media posts;
   sorting the plurality of collected social media posts into one or more location categories based on the associated reference data;
   extracting latent topics from the captions associated with the social media posts; and
   correlating the extracted latent topics with one or more location categories into which the plurality of collected social media posts are sorted.

7. The non-transitory computer readable medium of claim 6, further comprising:
   transmitting the social media post to a social media network with the generated at least one caption.

8. The non-transitory computer readable medium of claim 6, further comprising:
   transmitting the generated at least one caption to a user prior to transmitting the social media post to a social media network,
   transmitting the social media post to a social media network based on receiving an approval of the generated caption from the user.

9. The non-transitory computer readable medium of claim 8, further comprising:
   transmitting a request for additional reference data to the user based on not receiving an approval of the generated at least one caption from the user; and generating a second caption for the social media post based on the identified language model, the inferred topic, and additional reference data received from the user.

10. The non-transitory computer readable medium of claim 6, wherein the collected reference data associated with the social media post comprises one or more of: a textual description relevant to common user activities at one or more locations, a textual description relevant to common user activities at one or more location categories, a location description and a location category description.

11. A server apparatus configured to generate a caption for a social media post, the server apparatus comprising:
a memory; and
a processor configured to:
receive a social media post to be posted to a social media network;
collect reference data indicative of activities commonly occurring at a category of location associated with the social media post;
infer potential topics for captions from a topic inference model, based on the activities commonly occurring at a category of location indicated by the collected reference data associated with the social media post by extracting data indicative of the commonly occurring activities at the category or location from the social media post using one or more of image recognition, text recognition, audio recognition;
setting parameters associated with a language model based on the inferred topic;
generate at least one caption for the social media post based on the identified language model, and the inferred topic;
wherein the processor is further configured to generate the topic inference model based on reference data and captions associated with a plurality of collected social media post by:
collecting the reference data and the captions associated with the plurality of collected social media posts;
sorting the plurality of collected social media posts into one or more location categories based on the associated reference data;
extracting latent topics from the captions associated with the social media posts; and
correlating the extracted latent topics with one or more location categories into which the plurality of collected social media posts are sorted.

12. The server apparatus of claim 11, wherein the processor is further configured for:
transmitting the social media post to a social media network with the generated at least one caption.

13. The server apparatus of claim 11, wherein the processor is further configured for:
transmitting the generated at least one caption to a user prior to transmitting the social media post to a social media network; and
transmitting the social media post to a social media network based on receiving an approval of the generated at least one caption from the user.

14. The server apparatus of claim 13, wherein the processor is further configured for:
transmitting a request for additional reference data to the user based on not receiving an approval of the generated at least one caption from the user; and
generating a second caption for the social media post based on the identified language model, the inferred topic, and additional reference data received from the user.

15. The server apparatus of claim 11, wherein the collected reference data associated with the social media post comprises one or more of: a textual description relevant to common user activities at one or more locations; a textual description relevant to common user activities at one or more location categories; a location description and a location category description.

\* \* \* \* \*